ations Patent Office 3,205,249
Patented Sept. 7, 1965

3,205,249
ARYL ESTERS OF UNSATURATED
SULFONIC ACIDS
Wilhelm Friedrichsen and Harry Distler, Ludwigshafen (Rhine), Germany, assignors to Badische Anilin- & Soda-Fabrik Aktiengesellschaft, Ludwigshafen (Rhine), Germany
No Drawing. Filed Dec. 5, 1961, Ser. No. 160,392
Claims priority, application Germany, Dec. 9, 1960, B 60,408
7 Claims. (Cl. 260—456)

This invention relates to new aryl esters of sulfonic acids which have one olefinic linkage in the sulfonic acid radical or, more accurately, have one carbon-carbon double linkage in δ,ε-position to the sulfonic acid ester group. The invention further relates to a process for the production of the new sulfonic acid esters.

Sulfonic acid esters are known which contain an aliphatic sulfonic acid radical with two to three carbon atoms and a double linkage in α,β-position with respect to the sulfonic acid ester group. Vinylsulfonic acid phenyl ester is an example of such an ester. This compound is prepared by reacting β-chloroethanesulfonic acid chloride with an alkali phenolate. The other unsaturated sulfonic acid esters of the said type may be obtained in an analogous way.

It is an object of this invention to provide new sulfonic acid aryl esters which have a carbon-carbon double linkage in δ,ε-position to the sulfonic acid ester group and which contain at least five carbon atoms in the sulfonic acid radical. Another object of this invention is to provide a process for the production of these new sulfonic acid aryl esters in good yields.

In accordance with this invention the said objects are achieved by reacting an olefine containing at least one methyl and/or methylene group adjacent to the double linkage with a vinylsulfonic acid aryl ester at temperatures between 100 and 300° C.

When using isobutylene and vinylsulfonic acid phenyl ester, for example, the reaction proceeds with the formation of the phenyl ester of 2-methylpentene-(1)-sulfonic acid-(5) according to the following equation:

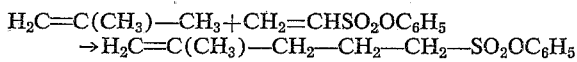

Olefinic initial materials which may be used include olefines with three to twenty carbon atoms and having at least one methyl and/or methylene group adjacent to the double linkage. Examples of such olefines are propylene, isobutylene, butene-1, butene-2, hexene-1, hexene-2, hexene-3, 3-phenylpropene-2, 4-phenylbutene-2, heptene-1, 3-methyleneheptane, octene-2, di-isobutylene, dodecene-1, tetrameric propylene, tetrameric butene-1, hexadecene-1, octadecene-1 and octadecene-9.

The preferred olefines contain 3 to 12 carbon atoms and have, apart from the double linkage, saturated aliphatic or saturated aliphatic and aromatic hydrocarbon structure.

The new process is generally applicable to vinylsulfonic acid aryl esters. It will be understood that the nature of the aromatic hydroxy compound from which the ester is derived is not critical. The ester group does not participate in the reaction and there is no marked difference in the influence of the various aryl radicals on the reactivity of the vinyl group.

Suitable vinylsulfonic acid aryl esters are especially vinylsulfonic acid phenyl ester, vinylsulfonic acid naphthyl ester and derivatives thereof substituted in the phenyl or naphthyl nucleus. Suitable substituents include saturated hydrocarbon radicals such as alkyl with 1 to 12 carbon atoms, of which two adjacent radicals may form a five- or six-membered carbocyclic ring together with the carbon atoms of a phenyl nucleus substituted thereby. Other suitable substituents are halogen atoms, such as chlorine and bromine, alkoxy groups with one to six carbon atoms, and esterified carboxyl groups. The alcohol component thereof may be an alkanol with one to six carbon atoms or a phenol which may be substituted by one to five identical or different substituents, such as halogen, alkoxy groups with one to four carbon atoms and/or alkyl groups with one to four carbon atoms. The carboxyl group may further be esterified with an aralkanol having seven to fourteen carbon atoms or a cycloalkanol with six to ten carbon atoms. The phenyl or naphthyl radical of the vinylsulfonic acid aryl esters may have one to five identical or different substituents of the kind mentioned.

Preferred vinylsulfonic acid aryl esters are derived from phenol, from the naphthols or from singly to triply substituted phenols. The substituents in these preferred starting compounds may be alkyl groups or alkoxy groups with one to four carbon atoms in each case, chlorine or the carboxyphenyl group.

More specifically, the vinylsulfonic acid esters of the following phenols may be used: phenol, α- and β-naphthol, 2-chlorophenol, 3-chlorophenol, 4-chlorophenol, 2,4-dichlorophenol, 2,6-dichlorophenol, 2,5-dichlorophenol, 2,4,6-trichlorophenol, 2,3,4-trichlorophenol, 2,3,4,5-tetrachlorophenol, 2,3,4,5,6-pentachlorophenol, the corresponding bromophenols, o-, m- or p-cresol, 2,4-dimethylphenol, 2-ethylphenol, 4-tertiary-butylphenol, 4-n-hexylphenol, 4-dodecylphenol, 2-methyl-4-isopropylphenol, 2-propyl-4-hexyl-6-methylphenol, 4-ethoxyphenol, 2-methoxyphenol, 4-hexoxyphenol, 2,4-dimethoxyphenol, 2,6-dimethoxy-4-butoxyphenol, 2 - carbomethoxyphenol, 2-carbophenoxyphenol, 2-carbo-(4'-chloro)-phenoxyphenol, 3-(carbo-2'-methoxy-phenoxy)-phenol, 4-(carbo-2'-ethoxy-4'-chloro-phenoxy)-phenol, 2-(carbo-2',4'-dimethylphenoxy)-phenol, 2 - (carbo - 2' - butyl - phenoxy)-phenol, ac-α-tetralol and ac-β-tetralol.

The process according to this invention is preferably carried out by heating together the initial materials in a pressure vessel. The reactants may be used in equivalent amounts. One or other initial material may however be used in excess. It has been found to be especially advantageous to use the olefinic components in excess, for example in amounts of 1 to 10 moles of olefine per mole of vinylsulfonic acid aryl ester. The whole is then heated at temperatures between 100° and 300° C. preferably at 200° to 250° C. The reaction period depends on the reaction temperature and on the pressure and may be one to thirty hours.

The pressure at which the process is carried out may vary within wide limits. Thus it is possible to work at atmospheric pressure and also at pressures up to 200 atmospheres. Very good results are obtained at pressures between 1 and 120 atmospheres. As a rule, the pressure is not an independent variable but results from the amounts of initial materials, the size of the reaction chamber and the vapor pressures of the reactants at the temperature chosen. The pressure may however also be brought to a higher value by forcing in an inert gas, such as nitrogen, carbon dioxide or argon.

The reaction may be carried out with or without solvents. Suitable solvents are those which are inert under the reaction conditions, for example higher hydrocarbons, such as hexane, heptane, octane, dodecane, cyclohexane, methylcyclohexane, benzene, chlorobenzene, dichlorobenzene, ethers, such as dioxane, tetrahydrofurane, glycol dimethyl ether, butyrolactone and dimethyl sulfoxide. It is advantageous to add a small amount of a polymerization inhibitor, for example hydroquinone or pyrogallol. The process may be carried out continuously or batchwise.

After the reaction has ended, the reaction mixture is cooled. It may be necessary to decompress the reaction mixture prior to working up. In the following fractional distillation, advantageously under reduced pressure, the desired reaction product is obtained in great purity as well as unchanged initial material.

The new vinylsulfonic acid aryl esters have the general formula:

$$R_1\text{—}SO_2\text{—}OR_2 \qquad (I)$$

in which $R_1$ denotes a hydrocarbon radical such as alkenyl with at least five carbon atoms, preferably five to twenty-two carbon atoms, which has one olefinic double linkage in $\delta,\epsilon$-position to the sulfonic acid ester grouping, and $R_2$ denotes an aryl radical.

In the preferred vinylsulfonic acid aryl esters of the Formula I, $R_1$ denotes a hydrocarbon radical with five to twenty-two carbon atoms and one double linkage in $\delta,\epsilon$-position with respect to the sulfonic acid ester group and $R_2$ denotes phenyl or naphthyl, or phenyl or naphthyl substituted one to five times by saturated hydrocarbon radicals such as alkyl with 1 to 12 carbon atoms of which two adjacent radicals may form a five- or six-membered carbocyclic ring with the carbon atoms of a phenyl nucleus substituted by said hydrocarbon radicals, or halogen, especially bromine or chlorine, alkoxy groups with one to six carbon atoms, and/or esterified carboxyl groups. The carboxyl group may be esterified with an alkanol having one to six carbon atoms or with phenol which may be substituted by one to five identical or different substituents, such as halogen, alkoxy groups with one to four carbon atoms and/or alkyl groups with one to four carbon atoms. The carboxyl group may further be esterified with an aralkanol having seven to fourteen carbon atoms and a cycloalkanol with six to ten carbon atoms.

In especially preferred vinylsulfonic acid aryl esters of the general Formula I, $R_1$ denotes a hydrocarbon radical with five to fourteen carbon atoms and containing an olefinic double linkage in $\delta,\epsilon$-position to the sulfonic acid ester group, said hydrocarbon radical, apart from the double linkage, being saturated aliphatic or saturated aliphatic and aromatic in structure. $R_2$ denotes phenyl, naphthyl, or phenyl substituted one to three times by alkyl or alkoxy groups each with one to four carbon atoms, chlorine or the carboxyphenyl group.

The products obtained may be used for example as plasticizers and textile auxiliaries. Thus, for example, polyvinyl chloride into which 40% by weight of tetradecenesulfonic acid o-cresyl ester, prepared according to Example 5, has been kneaded by treatment on rollers at about 160° C. for eight minutes, has very good flexibility and impact strength. Similar results are obtained by using other unsaturated sulfonic acid aryl esters in accordance with this invention. By saponifying the esters, the sulfonic acids on which they are based are obtained and these may also be used as plasticizers for polyvinyl chloride.

The invention is illustrated by, but not limited to, the following examples in which parts are by weight.

*Example 1*

40 parts of vinylsulphonic acid phenyl ester, 40 parts of propylene and 0.1 part of hydroquinone are heated for an hour at 250° C. in an autoclave. The pressure is 110 atmospheres. By fractionation at 0.3 mm. Hg there are obtained from the reaction mixture 20 parts of unchanged ester, 4 parts of residue and 19 parts of pentene-(1)-sulphonic acid-(5)-phenyl ester having the boiling point 145° to 150° C. The yield is 77.2% of the theory with reference to the reacted vinylsulphonic acid ester.

*Example 2*

40 parts of vinylsulphonic acid phenyl ester, 60 parts of isobutylene and 0.1 part of pyrogallol are heated for five hours at 200° C. in a refined steel autoclave, the pressure rising to 70 atmospheres. By fractionation at 0.25 mm. Hg pressure, 15 parts of unchanged ester, 28 parts of 2-methylpentene-(1)-sulphonic acid-(5) phenyl ester of the boiling point 145° to 150° C. and 4 parts of residue are obtained. The yield is 85.9% of the theory with reference to the vinyl ester reacted.

*Example 3*

50 parts of 3-phenylpropene-2 and 60 parts of vinylsulphonic acid o-cresyl ester are heated for twelve hours at 200° C. in a pressure vessel, the pressure rising to 10 atmospheres. By distilling the reaction mixture at 0.5 mm. Hg pressure, 29 parts of the o-cresol ester of 1-phenylpentene-(1)-sulphonic acid-(5) having the boiling point 215° to 225° C. are obtained. The yield is 30% of the theory.

*Example 4*

600 parts of vinylsulphonic acid o-cresyl ester, 530 parts of di-isobutylene and 1 part of hydroquinone are heated for eight hours at 200° C. in an alloy steel pressure vessel, the pressure rising to 10 atmospheres. By fractional distillation of the product at 0.3 mm. Hg pressure, 311 parts of unchanged ester, 50 parts of residue and 381 parts of a decenesulphonic acid o-cresyl ester having the boiling point 160° to 175° C. are obtained. The yield is 84.5% of the theory with reference to the vinyl ester reacted.

*Example 5*

1000 parts of dodecylene (tetrameric propylene) is heated in a pressure vessel with 800 parts of vinylsulphonic acid o-cresyl ester and 1 part of pyrogallol for twenty-four hours at 200° C. The reaction product is distilled at 0.5 mm. Hg pressure. 596 parts of sulphonic acid ester is contained in the mixture of unchanged products. In addition, 46 parts of residue and 344 parts of tetradecenesulphonic acid o-cresyl ester having the boiling point 190 to 210° C. at 0.5 mm. Hg pressure are obtained. The yield is 91.3% of the theory with reference to the vinylsulphonic acid o-cresyl ester reacted.

Tetradecenesulphonic acid $\beta$-naphthyl ester is obtained in an analogous way by using 946 parts of vinylsulphonic acid $\beta$-naphthyl ester instead of vinylsulphonic acid o-cresyl ester.

*Example 6*

600 parts of isobutylene, 600 parts of the vinylsulphonic acid ester of p-(1,1,3,3-tetramethylbutyl)-phenol and 1 part of hydroquinone are heated in a pressure vessel for five hours at 200° C. The initial pressure is 24 atmospheres. By distilling the reaction mixture at 0.5 mm. Hg pressure, 100 parts of unchanged ester, 150 parts of substances of high boiling point and 390 parts of the 2-methylpentene-(1)-sulphonic acid-(5) ester of p-(1,1,3,3-tetramethylbutyl)-phenol having the boiling point 180° to 195° C. are obtained. The yield is 65.5% of the theory with reference to the initial ester reacted.

*Example 7*

60 parts of vinylsulphonic acid o-chlorophenyl ester, 60 parts of isobutylene and 1 part of pyrogallol are heated for five hours at 200° C. in a pressure vessel, the initial pressure being 31 atmospheres. By fractional distillation of the reaction mixture at 0.5 mm. Hg pressure, 5 parts of unchanged ester, 17 parts of residue and 46 parts of 2-methylpentene - (1) - sulphonic acid-(5) o-chlorophenyl ester having the boiling point 160° to 170° C. are obtained.

*Example 8*

600 parts of vinylsulphonic acid (2,4-dichloro)-phenyl ester, 600 parts of isobutylene and 1 part of pyrogallol are heated for five hours at 200° C. in a refined steel autoclave. The pressure reaches 55 atmospheres. The product is fractionally distilled at 0.5 mm. Hg pressure. In addition to 420 parts of unchanged ester and 80 parts of residue, 170 parts of 2-methylpentene-(1)-sulphonic acid-(5)-(2',4'-dichloro)-phenyl ester having the boiling point 170° to 180° C. are obtained. The yield is 77% of the theory with reference to initial ester reacted.

The 2-methylpentene-(1)-sulphonic acid ester of ac-α-tetralol is obtained in an analogous way by using 565 parts of the vinylsulphonic acid ester of ac-α-tetralol instead of vinylsulphonic acid (2,4-dichloro)-phenyl ester.

*Example 9*

60 parts of di-isobutylene, 60 parts of vinylsulphonic acid guaiacol ester and 1 part of pyrogallol are heated in a pressure vessel under a pressure of 50 atmospheres of nitrogen for five hours at 200° C. By fractional distillation of the product at 0.3 mm. Hg pressure, 30 parts of decenesulphonic acid guaiacol ester having the boiling point 180° to 205° C. are obtained. The yield is 54% of the theory with reference to ester reacted. The residue is 24 parts.

*Example 10*

600 parts of isobutylene, 600 parts of vinylsulphonic acid-(4-chloro-3-methyl)-phenyl ester, 600 parts of chlorobenzene and 10 parts of hydroquinone are heated for six hours at 210° C. in a pressure vessel, the initial pressure being 30 atmospheres. By fractional distillation of the reaction mixture at 0.3 mm. Hg pressure, 120 parts of unchanged ester and 520 parts of 2-methyl-pentene-(1)-sulphonic acid - (5) - (4'-chloro-3'-methyl)-phenyl ester having the boiling point 180° to 185° C. are obtained. The yield is 86% of the theory with reference to initial ester reacted.

*Example 11*

120 parts of the vinyl-sulphonic acid ester of salicylic acid phenyl ester and 120 parts of isobutylene are heated in a pressure vessel in the presence of 200 parts of xylene and 2 parts of pyrogallol for ten hours at 180° C. The pressure rises to 10 atmospheres. By fractional distillation of the reaction mixture at 0.5 mm. Hg pressure, 28 parts of unchanged ester, 44 parts of residue and 77 parts of the 2-methylpentene-(1)-sulphonic acid-(5) ester of phenyl salicylate having the boiling point 245°–255° C. are obtained. The yield is 70% of the theory with reference to initial ester reacted.

We claim:
1. A compound of the formula

$$R_1—SO_2OR_2$$

in which:
 $R_1$ represents alkenyl of five to twenty-two carbon atoms with its single olefinic double linkage in δ, ε-position to the sulfonic acid ester group; and
 $R_2$ represents a member selected from the class consisting of phenyl and phenyl substituted by at least one radical selected from the class consisting of alkyl of 1 to 12 carbon atoms, alkoxy of 1 to 4 carbon atoms, chlorine, bromine and carbophenoxy.
2. Pentene-(1)-sulphonic acid-(5) phenyl ester.
3. 2-methylpentene-(1)-sulphonic acid-(5) phenyl ester.
4. 2-methylpentene-(1)-sulphonic acid-(5) (1',1',3',3'-tetramethylbutyl)-phenyl ester.
5. 2-methylpentene-(1)-sulphonic acid-(5) (2',4'-dichloro)-phenyl ester.
6. 2-methylpentene-(1)-sulphonic acid-(5) (4'-chloro-3'-methyl)-phenyl ester.
7. The ester of 2-methylpentene-(1)-sulphonic acid-(5) with phenyl salicylate.

References Cited by the Examiner

UNITED STATES PATENTS 2,348,705  5/44  Alderman et al. _____ 260—456
2,728,749  12/55  Coover et al. _____ 260—456
3,128,307  4/64  Zorn et al. _____ 260—456 X

OTHER REFERENCES

D'Alelio: "Fundamental Principles of Polymerization," page 327 (1952).

Golding: "Polymerics and Resins," pages 41–43 (1959).

Kainer: "Polyvinylchlorid und Vinylchlorid-Mischpolymerisate," page 20 (1951).

Schildknecht: "Vinyl and Related Polymers," page 8 (1952).

CHARLES B. PARKER, *Primary Examiner.*